US010547428B2

United States Patent
Ly et al.

(10) Patent No.: US 10,547,428 B2
(45) Date of Patent: Jan. 28, 2020

(54) DEDICATED REFERENCE SIGNAL FOR PHYSICAL BROADCAST CHANNEL

(71) Applicant: QUALCOMM Incorporated, San Diego, CA (US)

(72) Inventors: Hung Ly, San Diego, CA (US); Wanshi Chen, San Diego, CA (US); Heechoon Lee, San Diego, CA (US); Tingfang Ji, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/802,149

(22) Filed: Nov. 2, 2017

(65) Prior Publication Data

US 2018/0131489 A1 May 10, 2018

Related U.S. Application Data

(60) Provisional application No. 62/417,958, filed on Nov. 4, 2016.

(51) Int. Cl.
*H04L 5/00* (2006.01)
*H04J 1/00* (2006.01)

(52) U.S. Cl.
CPC .............. *H04L 5/0051* (2013.01); *H04J 1/00* (2013.01)

(58) Field of Classification Search
CPC ... H04L 5/0051; H04L 5/0091; H04L 5/0023; H04L 5/001; H04L 25/02; H04L 27/2611; H04J 1/00
See application file for complete search history.

(56) References Cited

U.S. PATENT DOCUMENTS

| | | | | |
|---|---|---|---|---|
| 2012/0163335 A1* | 6/2012 | Chung | ................. | H04L 5/0023 370/330 |
| 2013/0114756 A1* | 5/2013 | Jia | ........................... | H04J 11/00 375/295 |
| 2014/0086192 A1* | 3/2014 | Kim | ................... | H04W 72/042 370/329 |
| 2016/0020878 A1* | 1/2016 | Yokomakura | ......... | H04L 5/0023 370/329 |
| 2016/0277225 A1* | 9/2016 | Frenne | .............. | H04W 56/0015 |
| 2017/0310431 A1* | 10/2017 | Iyer | ....................... | H04L 1/1816 |

OTHER PUBLICATIONS

Zaidi, Ali A., et al. "Waveform and numerology to support 5G services and requirements." IEEE Communications Magazine54.11 (2016): 90-98. (Year: 2016).*

(Continued)

*Primary Examiner* — Curtis A Alia
(74) *Attorney, Agent, or Firm* — Arent Fox LLP

(57) ABSTRACT

A method and apparatus for utilizing a dedicated reference signal for demodulating a Physical Broadcast Channel (PBCH) in a wireless communication system is disclosed. For example, the method and apparatus include configuring, at a network entity, at least one dedicated Demodulation Reference Signal (DMRS) in one or more symbols corresponding to a PBCH, each dedicated DMRS being used for demodulating the PBCH. The described aspects further include transmitting, by the network entity, the at least one dedicated DMRS to one or more UEs using at least a single antenna port.

38 Claims, 13 Drawing Sheets

(56) References Cited

OTHER PUBLICATIONS

International Search Report and Written Opinion—PCT/US2016/041194—ISA/EPO—dated Feb. 5, 2018.
LG Electronics: "Evaluations on Downlink Channels for NB-IoT Stand-Alone Operation", 3GPP Draft; R1-155805, Evaluations on Downlink Channels for NB-IoT Stand-Alone Operation, 3rd Generation Partnership Project (3GPP), Mobile Competence Centre, 650 Route Des Lucioles, F-06921, Sophia, vol. RAN WG1, No. Malmo, Sweden, Oct. 5, 2015-Oct. 9, 2015, Oct. 4, 2015 (Oct. 4, 2015), XP051002608, Retrieved from the Internet: URL:http://www.3gpp.org/ftp/Meetings_3GPPSYNC/RAN1/Docs/, 7 pages, [retrieved on Oct. 4, 2015].
QUALCOMM Incorporated: "Single Beam PBCH Design Considerations", 3GPP Draft; R1-1610157, Single_Beam_PBCH_Design, 3rd Generation Partnership Project (3GPP), MobileCompetence Centre, 650 Route Des Lucioles, F-06921, Sophia-Antipolis Cedex, France, vol. RAN WG1, No. Lisbon, Portugal, Sep. 10, 2016-Sep. 14, 2016, Oct. 9, 2016 (Oct. 9, 2016), XP051150180, Retrieved from the Internet: URL:http://www.3gpp.org/ftp/Meetings_3GPPSYNC/RAN1/Docs/, 3 pages, [retrieved on Oct. 9, 2016].

\* cited by examiner

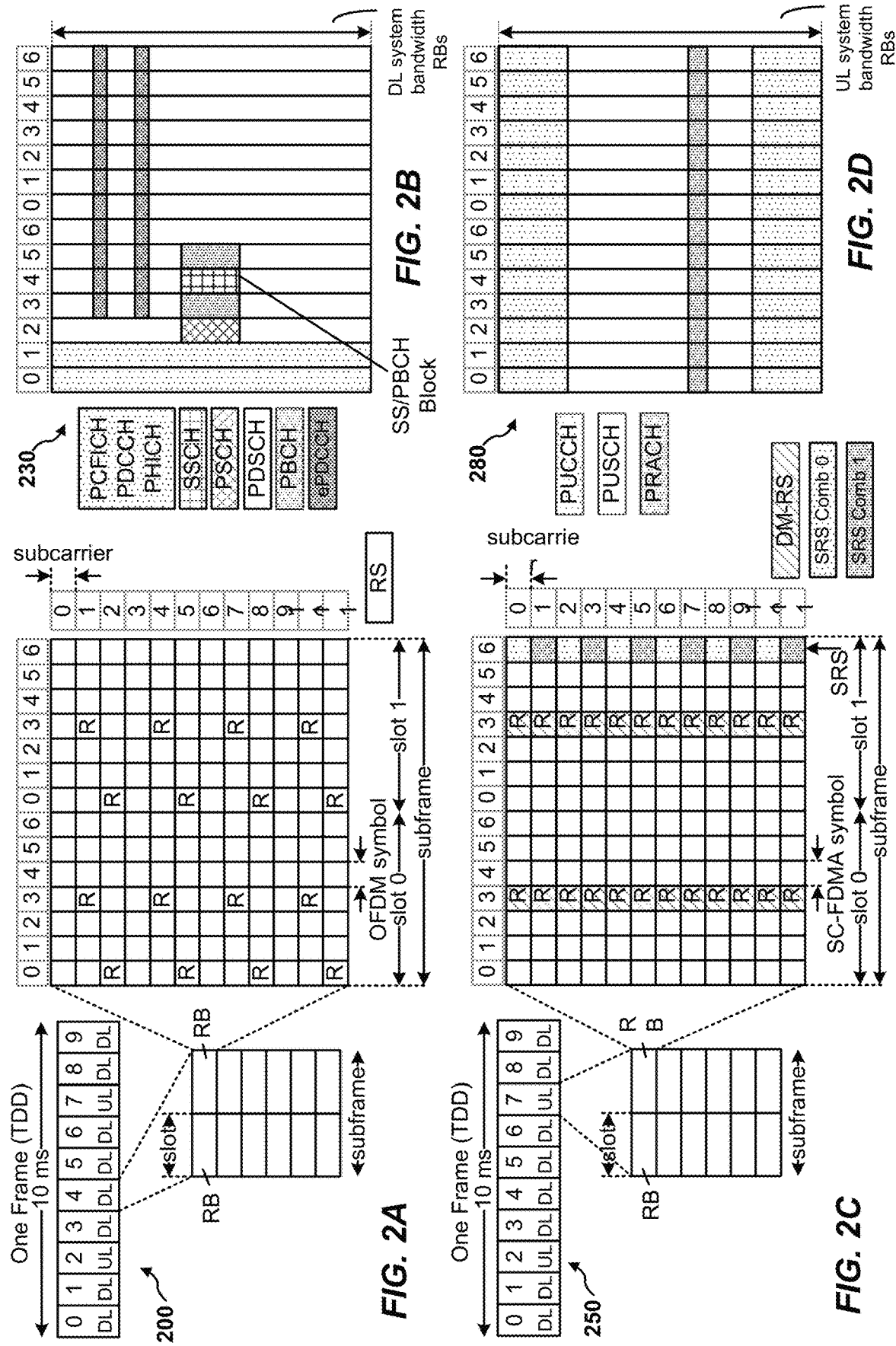

DEDICATED REFERENCE SIGNAL FOR PHYSICAL BROADCAST CHANNEL

CLAIM OF PRIORITY UNDER 35 U.S.C. § 119

The present Application for Patent claims priority to U.S. Provisional Application No. 62/417,958 entitled "DEDICATED REFERENCE SIGNAL FOR PHYSICAL BROADCAST CHANNEL" filed Nov. 4, 2016, which is assigned to the assignee hereof and hereby expressly incorporated by reference herein.

BACKGROUND

Aspects of the present disclosure relates generally to communication systems, and more particularly, to utilizing a dedicated reference signal for demodulating a Physical Broadcast Channel (PBCH) in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

In long term evolution (LTE) networks, a cell specific reference signal (CRS) is transmitted which is used for demodulation of PBCH at a user equipment (UE). That is, for NR communications technology and beyond, the CRS is not utilized and/or transmitted.

Therefore, for NR communications technology and beyond (and with LTE communications technology, improvements in demodulation of the PBCH may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for utilizing a dedicated reference signal for demodulating a PBCH for wireless communications. The described aspects include configuring, at a network entity, at least one dedicated Demodulation Reference Signal (DMRS) in one or more symbols corresponding to a PBCH, each dedicated DMRS being used for demodulating the PBCH. The described aspects further include transmitting, by the network entity, the at least one dedicated DMRS to one or more UEs using at least a single antenna port.

In an aspect, an apparatus, such as a network entity, for utilizing a dedicated reference signal for demodulating a PBCH for wireless communications may include a transceiver, a memory; and at least one processor coupled with the memory and configured to configure at least one dedicated DMRS in one or more symbols corresponding to a PBCH, each dedicated DMRS being used for demodulating the PBCH. The described aspects further transmit the at least one dedicated DMRS to one or more UEs using at least a single antenna port.

In an aspect, a computer-readable medium may store computer executable code for utilizing a dedicated reference signal for demodulating a PBCH for wireless communications is described. The described aspects include code for configuring, at a network entity, at least one dedicated DMRS in one or more symbols corresponding to a PBCH, each dedicated DMRS being used for demodulating the PBCH. The described aspects further include code for transmitting, by the network entity, the at least one dedicated DMRS to one or more UEs using at least a single antenna port.

In an aspect, an apparatus for utilizing a dedicated reference signal for demodulating a PBCH for wireless communications is described. The described aspects include means for configuring, at a network entity, at least one dedicated DMRS in one or more symbols corresponding to a PBCH, each dedicated DMRS being used for demodulating the PBCH. The described aspects further include means for transmitting, by the network entity, the at least one dedicated DMRS to one or more UEs using at least a single antenna port.

In accordance with an aspect, a method for utilizing a dedicated reference signal for demodulating a PBCH for wireless communications. The described aspects include receiving, at a UE, at least one dedicated DMRS in one or more symbols corresponding to a PBCH from a network entity, each dedicated DMRS being used for demodulating the PBCH. The described aspects further include performing, by the UE, a channel estimation procedure on the PBCH based on the at least one dedicated DMRS. The described aspects further include demodulating, by the UE, the PBCH based on a result of performing the channel estimation procedure.

In an aspect, an apparatus, such as a UE, for utilizing a dedicated reference signal for demodulating a PBCH for wireless communications may include a transceiver, a memory; and at least one processor coupled with the memory and configured to receive at least one dedicated DMRS in one or more symbols corresponding to a PBCH from a network entity, each dedicated DMRS being used for demodulating the PBCH. The described aspects further perform a channel estimation procedure on the PBCH based on the at least one dedicated DMRS. The described aspects further demodulate the PBCH based on a result of performing the channel estimation procedure.

In an aspect, a computer-readable medium may store computer executable code for utilizing a dedicated reference signal for demodulating a PBCH for wireless communications is described. The described aspects include code for receiving, at a UE, at least one dedicated DMRS in one or more symbols corresponding to a PBCH from a network entity, each dedicated DMRS being used for demodulating the PBCH. The described aspects further include code for performing, by the UE, a channel estimation procedure on the PBCH based on the at least one dedicated DMRS. The described aspects further include code for demodulating, by the UE, the PBCH based on a result of performing the channel estimation procedure.

In an aspect, an apparatus for utilizing a dedicated reference signal for demodulating a PBCH for wireless communications is described. The described aspects include means for receiving, at a UE, at least one dedicated DMRS in one or more symbols corresponding to a PBCH from a network entity, each dedicated DMRS being used for demodulating the PBCH. The described aspects further include means for performing, by the UE, a channel estimation procedure on the PBCH based on the at least one dedicated DMRS. The described aspects further include means for demodulating, by the UE, the PBCH based on a result of performing the channel estimation procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 2A, 2B, 2C, and 2D are diagrams illustrating examples of a DL subframe, DL channels within the DL subframe, an UL subframe, and UL channels within the UL subframe, respectively, for a 5G/NR frame structure;

DETAILED DESCRIPTION

Figure 1:
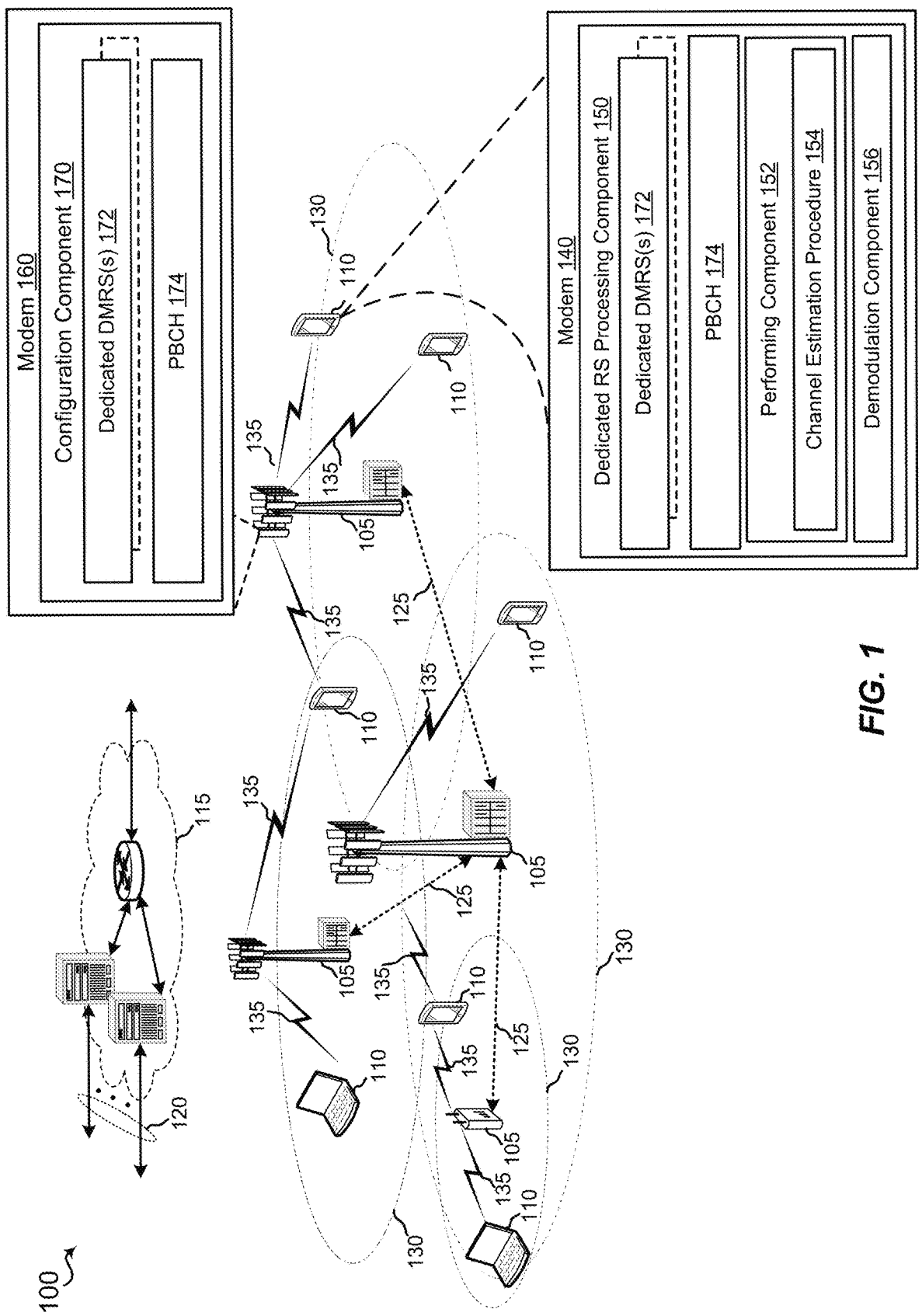
FIG. 1 is a schematic diagram of an example of a wireless communication network including at least one base station having a configuration component and at least one UE having a dedicated reference signal processing component.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure provides an example method and an apparatus for transmitting one or more dedicated reference signals (RSs) with a PBCH from a network entity (e.g., an eNB) that may include configuring, at a network entity, at least one dedicated DMRS in one or more symbols corresponding to a PBCH, each dedicated DMRS being used for demodulating the PBCH, and transmitting, by the network entity, the at least one dedicated DMRS to one or more UEs using at least a single antenna port. The present disclosure provides a method and an apparatus for receiving, at a UE, at least one dedicated DMRS in one or more symbols corresponding to a PBCH from a network entity, each dedicated DMRS being used for demodulating the PBCH, performing, by the UE, a channel estimation procedure on the PBCH based on the at least one dedicated DMRS, and demodulating, by the UE, the PBCH based on a result of performing the channel estimation procedure.

Additional features of the present aspects are described in more detail below with respect to FIGS. 1-11.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example of a wireless communication network 100 including at least one UE 110 and at least one base station 105. The UE 110 may include a modem 140 having a dedicated RS processing component 150 that demodulates of a PBCH using at least one dedicated RS, such as at least one dedicated DMRS 172 in a wireless communication system. Further, the wireless communication network 100 includes at least one base station 105 with a modem 160 having a configuration component 170 that utilizes a dedicated reference signal, such as a DMRS 172 for demodulating a PBCH 174.

In an aspect, the base station 105 and/or configuration component 170 may configure at least one dedicated DMRS 172 in one or more symbols corresponding to a PBCH 174. For example, each dedicated DMRS 172 may be used for demodulating the PBCH 174. In an example, the base station 105 and/or configuration component 170 may interleave the at least one dedicated DMRS 172 in each of the one or more symbols corresponding to the PBCH 174 based on frequency division multiplexing (FDM). Interleaving the at least one dedicated DMRS 172 may include assigning a resource element (RE) to each dedicated DMRS symbol of each of the at least one dedicated DMRS 172. Moreover, a remaining plurality of REs of each of the one or more symbols carry the PBCH, each of the remaining plurality of REs correspond to REs not assigned for each dedicated DMRS 172.

In an aspect, the base station 105 and/or configuration component 170 may transmit the at least one dedicated DMRS 172 to one or more UEs 110 using at least a single antenna port. For example, the base station 105 and/or configuration component 170 may transmit each of the one or more symbols corresponding to the PBCH 174 with the interleaved at least one dedicated DMRS 172 using the single antenna port.

In an aspect, the base station 105 and/or configuration component 170 may assign the at least one dedicated DMRS 172 to one or more symbols having a same numerology as the one or more symbols corresponding to the PBCH 174. For example, having the same numerology corresponds to each of the one or more symbols assigned with the at least one dedicated DMRS 172 and each of the one or more symbols corresponding to the PBCH 174 being configured with an identical sub-carrier spacing and identical cyclic prefix.

In an aspect, the base station 105 and/or configuration component 170 may assign a first dedicated DMRS to a first symbol and a second dedicated DMRS to a second symbol, the first dedicated DMRS being configured for a first antenna port and the second dedicated DMRS being configured for a second antenna port. For example, the base station 105 and/or configuration component 170 may transmit the first dedicated DMRS to the one or more UEs 110 using the first antenna port, and may transmit the second dedicated DMRS to the one or more UEs 110 using the second antenna port.

In an aspect, the base station 105 and/or configuration component 170 may assign a first dedicated DMRS to a first symbol and a second dedicated DMRS to a second symbol. For example, each of the first dedicated DMRS and the second dedicated DMRS includes a first transmission combination and a second transmission combination. Further, in another example, the base station 105 and/or configuration component 170 may transmit, for each of the first dedicated DMRS and the second dedicated DMRS, a first subset of tones to the one or more UEs 110 using a first antenna port, and transmit, for each of the first dedicated DMRS and the second dedicated DMRS, a second subset of tones to the one or more UEs 110 using a second antenna port, the second subset of tones differing from the first subset of tones.

In another aspect, the base station 105 and/or configuration component 170 may configure the at least one dedicated DMRS in each of the one or more symbols corresponding to the PBCH.

In an aspect, the UE 110 and/or dedicated RS processing component 150 may receive at least one dedicated DMRS 172 in one or more symbols corresponding to a PBCH 174 from a base station 105. For example, each dedicated DMRS 172 may be used for demodulating the PBCH 174.

In an aspect, the at least one dedicated DMRS 172 is interleaved in each of the one or more symbols corresponding to the PBCH 174 based on FDM. For example, each of the one or more symbols corresponding to the PBCH 174 includes a RE assigned to each dedicated DMRS symbol of each of the at least one dedicated DMRS 172. Further, each of the one or more symbols corresponding to the PBCH includes a remaining plurality of REs carrying the PBCH, each of the remaining plurality of REs correspond to REs not assigned for each dedicated DMRS 172.

In an aspect, the UE 110 and/or dedicated RS processing component 150 may receive the at least one dedicated DMRS 172 in the one or more symbols corresponding to the PBCH 174 from the base station 105 from on a single antenna port of the base station 105. Moreover, the UE 110 and/or dedicated RS processing component 150 may receive a first dedicated DMRS to a first symbol and a second dedicated DMRS to a second symbol. For example, the first dedicated DMRS in the first symbol and the second dedicated DMRS in the second symbol may have a same numerology as the one or more symbols corresponding to the PBCH 174. In an example, having the same numerology corresponds to each of the first symbol and second symbol and each of the one or more symbols corresponding to the PBCH 174 being configured with an identical sub-carrier spacing and identical cyclic prefix. Further, the UE 110 and/or dedicated RS processing component 150 may receive the first dedicated DMRS and the second dedicated DMRS from a first antenna port and a second antenna port of the base station 105.

In an aspect, the UE 110 and/or dedicated RS processing component 150 may execute a performing component 152 to implement a channel estimation procedure 154 on the PBCH 174 based on the at least one dedicated DMRS 172. Further, the UE 110 and/or dedicated RS processing component 150 may execute a demodulation component 156 to demodulate the PBCH 174 based on a result of implementing the channel estimation procedure 154.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave or MMW) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu * 15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3A:
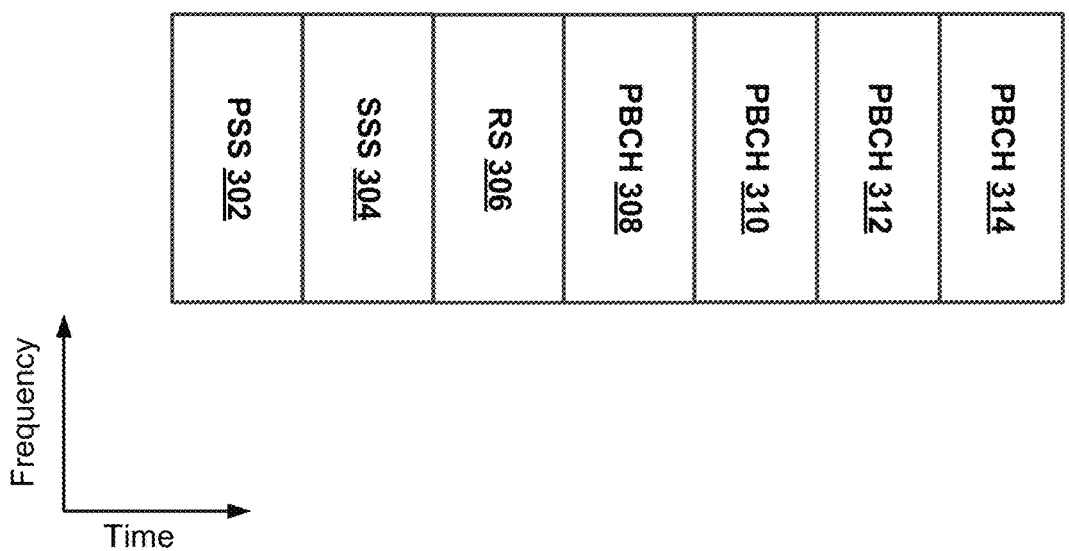
FIGS. 3A and 3B are conceptual diagrams of example configurations of transmitting dedicated reference signal.
Figure 3B:
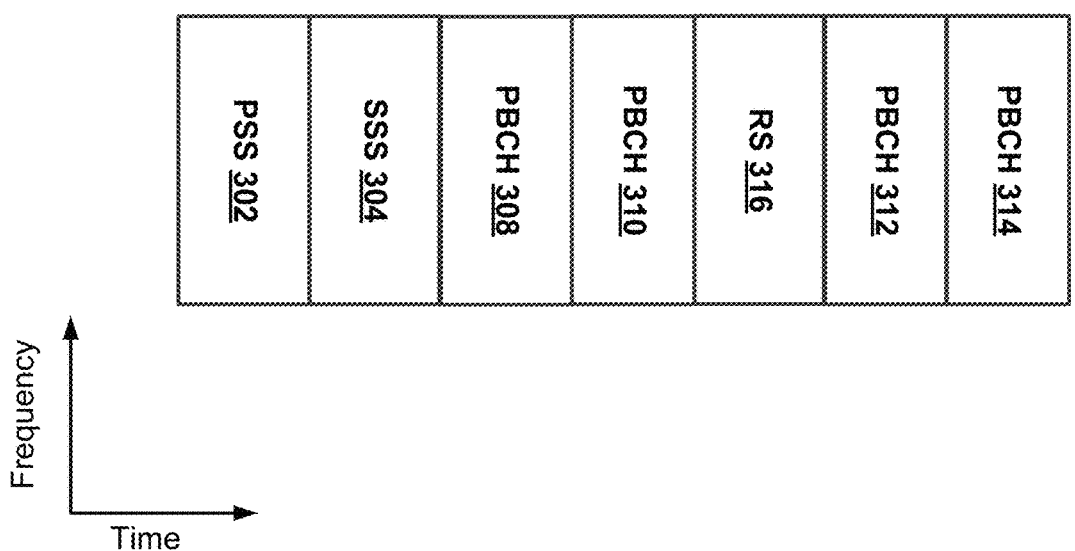

FIGS. 3A and 3B depict conceptual diagrams of example dedicated RS configurations 300 and 350, respectively. For example, a UE and a base station, such as, the UE 110 and the base station 105, respectively, may be configured to communicate at least one dedicated RS, such as at least one dedicated DMRS 172 for demodulating the PBCH 174.

FIG. 3A illustrates an aspect of the dedicated RS configuration 300. In an aspect, the base station 105 and/or configuration component 170 may transmit one RS in slot 306, which is located to the slot next to the slot 304 in which the secondary synchronization signal (SSS) is transmitted, along with a primary synchronization signal (PSS) in slot 302, a SSS in slot 304, and/or a PBCH in four slots 308, 310, 312, and 314. In an aspect, the RS may correspond to dedicated DMRS 172 and may have two combinations, e.g., a first combination and a second combination. The first combination may be used for a first antenna port and the second combination may be used for a second antenna port, if the base station 105 is configured with two antenna ports. However, the PBCH decoding performance degradation may be noticed in high mobility scenarios if only one RS is transmitted. Accordingly, FIG. 3B illustrates another aspect of the dedicated RS configuration 350 where the RS is located in slot 316 between the PBCH slots 310 and 312.

Figure 4:
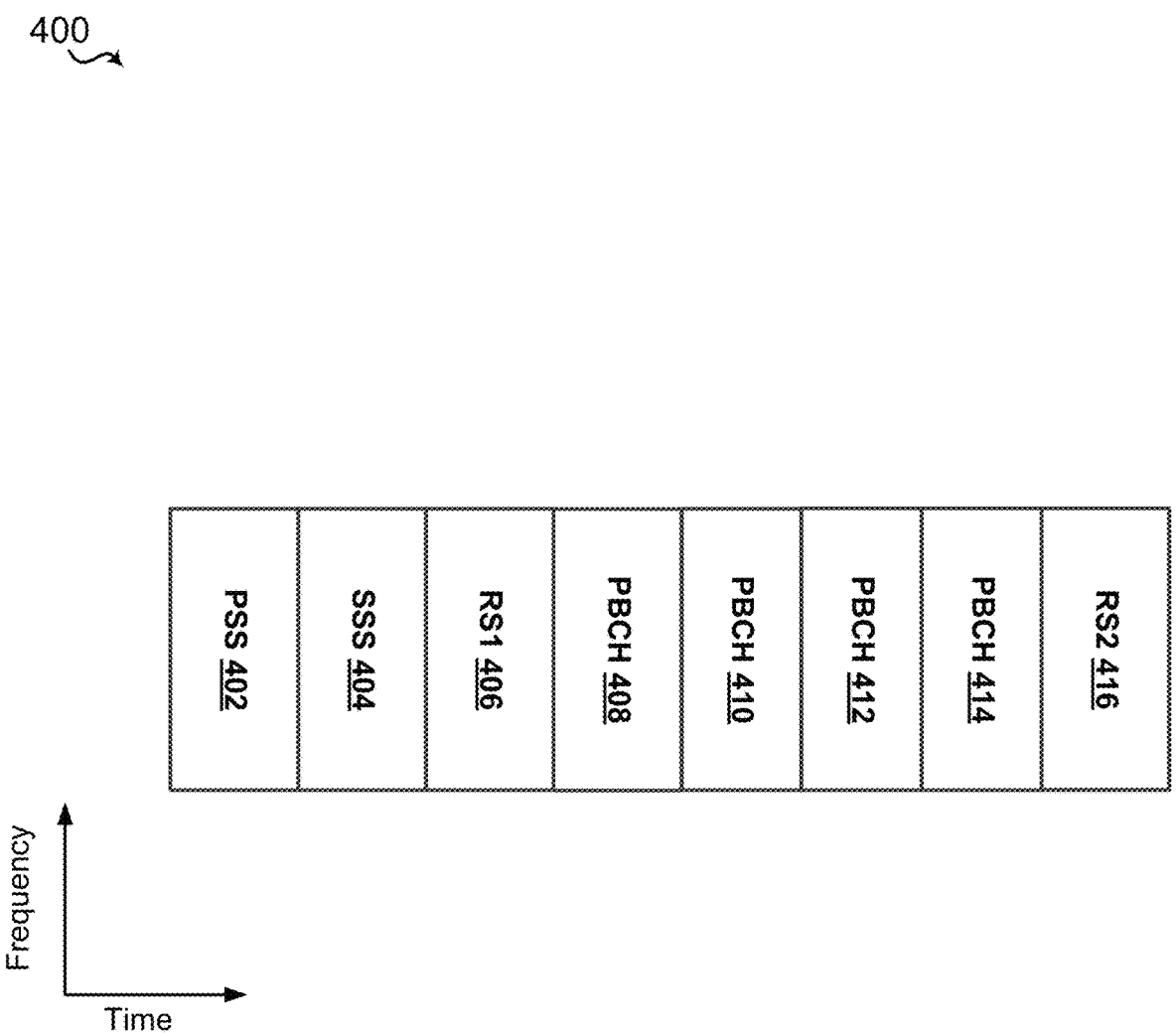
FIG. 4 is a conceptual diagram of another example configuration of transmitting at least one dedicated reference signal.

FIG. 4 illustrates a conceptual diagram of an example dedicated RS configuration 400. For example, a UE and a base station, such as, the UE 110 and the base station 105, respectively, may be configured to communicate at least one dedicated RS, such as at least one dedicated DMRS 172 for demodulating the PBCH 174.

In an aspect, the base station 105 and/or configuration component 170 may transmit two RSs, RS1 in slot 406 and RS2 in slot 416. For example, the RSs transmitted in slots 406 and 416 and the PBCH, transmitted in slots 408, 410, 412, and 414 may have the same numerology (e.g., subcarrier spacing, cyclic prefix, etc.).

In an aspect, the base station 105 may be configured with two antenna ports, and RS1 in slot 406 may be used for a first antenna port and RS2 in slot 416 may be used for a second antenna port. In addition, for example, each RS may have two combinations with one combination used for odd tones and another combination used for even tones of the same antenna port. Although the RS2 is shown in slot 416, the RS2 may also be transmitted in between the PBCH slots, for example, between slots 412 and 414.

Figure 5:
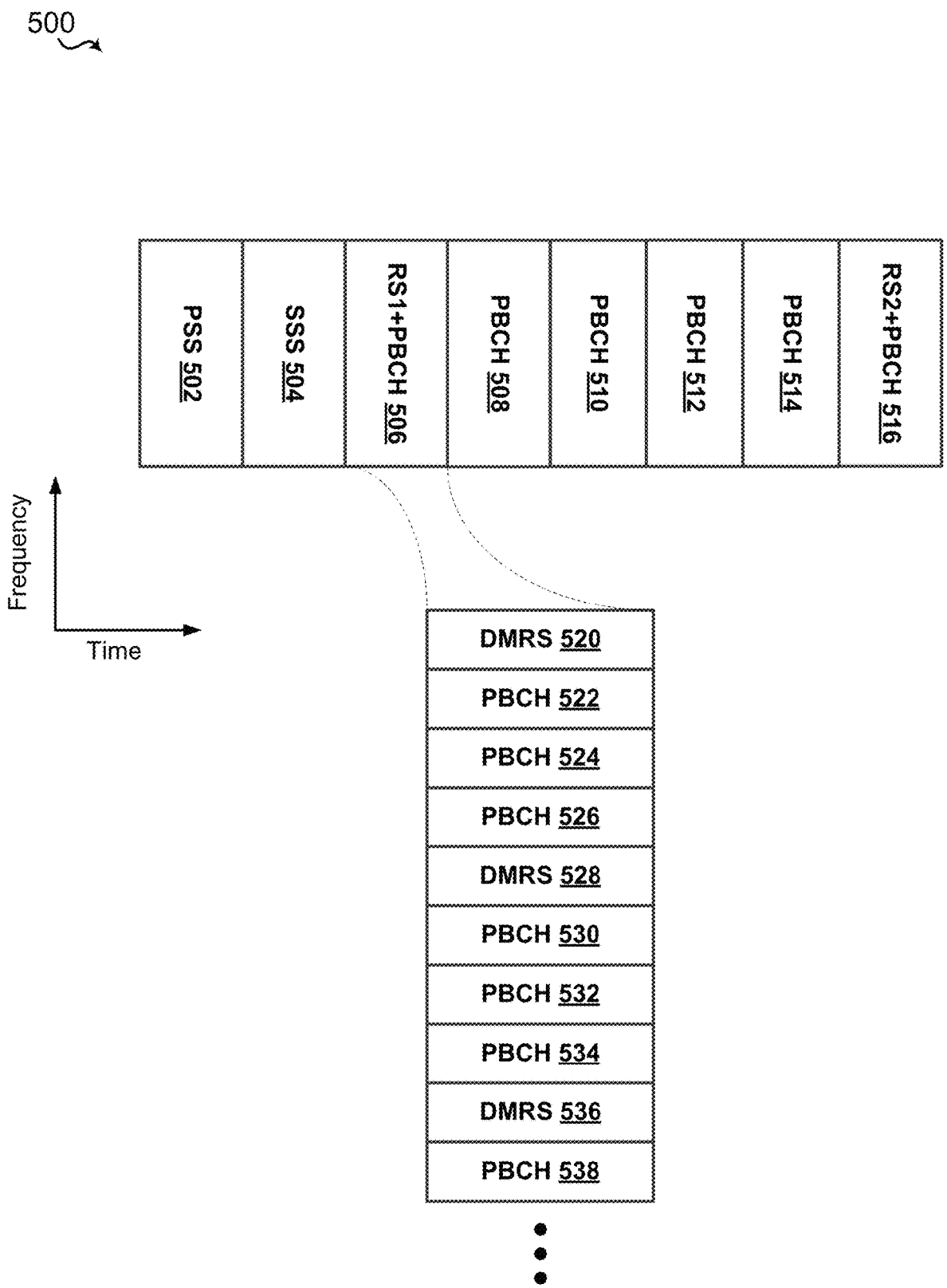
FIG. 5 is a conceptual diagram of another example configuration of transmitting at least one dedicated reference signal.

FIG. 5 illustrates a conceptual diagram of an example dedicated RS configuration 500. For example, a UE and a base station, such as, the UE 110 and the base station 105, respectively, may be configured to communicate at least one dedicated RS, such as at least one dedicated DMRS 172 for demodulating the PBCH 174.

In an aspect, the base station 105 and/or configuration component 170 may transmit two RSs, RS1 in slot 506 and RS2 in slot 516. However, the RSs in slots 506 and 516 may be interleaved/multiplexed with the PBCH in slots 506 and 516. For example, the base station 105 and/or configuration component 170 may configure at least one DMRS 172 in one or more symbols corresponding to a PBCH 174.

In an aspect, the base station 105 and/or configuration component 170 may interleave the at least one dedicated DMRS 172 in each of the one or more symbols corresponding to the PBCH 174 based on FDM. Interleaving the at least one dedicated DMRS 172 may include assigning a RE, such as REs 520, 828, and 536, to each dedicated DMRS symbol of each of the at least one dedicated DMRS 172. Moreover, a remaining plurality of REs 522, 524, 526, 530, 532, 534, and 538 of each of the one or more symbols may carry the PBCH.

Figure 6:
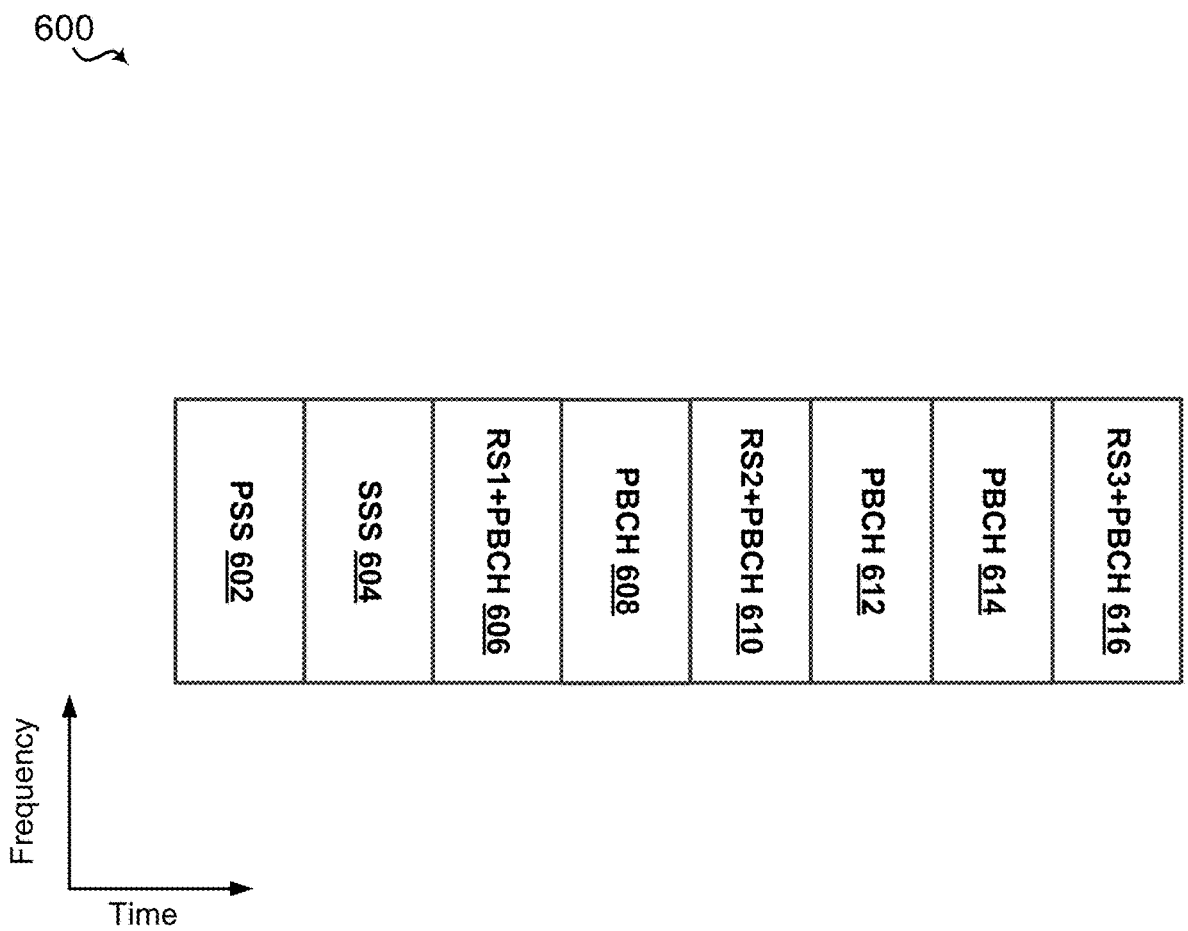
FIG. 6 is a conceptual diagram of another example configuration of transmitting at least one dedicated reference signal.

FIG. 6 illustrates a conceptual diagram of an example dedicated RS configuration 600. For example, a UE and a base station, such as, the UE 110 and the base station 105, respectively, may be configured to communicate at least one dedicated RS, such as at least one dedicated DMRS 172 for demodulating the PBCH 174.

In an aspect, the base station 105 and/or configuration component 170 may transmit three RSs, such as RS1 in slot 606, RS2 in slot 610, and/or RS3 in slot 616. Additionally, the RSs transmitted in slots 606, 610, and 616 are transmitted with the PBCH by interleaving each RS in each of the one or more symbols corresponding to the PBCH 174 based on FDM. The transmission of three RSs may be used by the UE 110, for example, for demodulation of the PBCH 174 in very high speed mobility scenarios (e.g., 500 km/h).

Figure 7A:
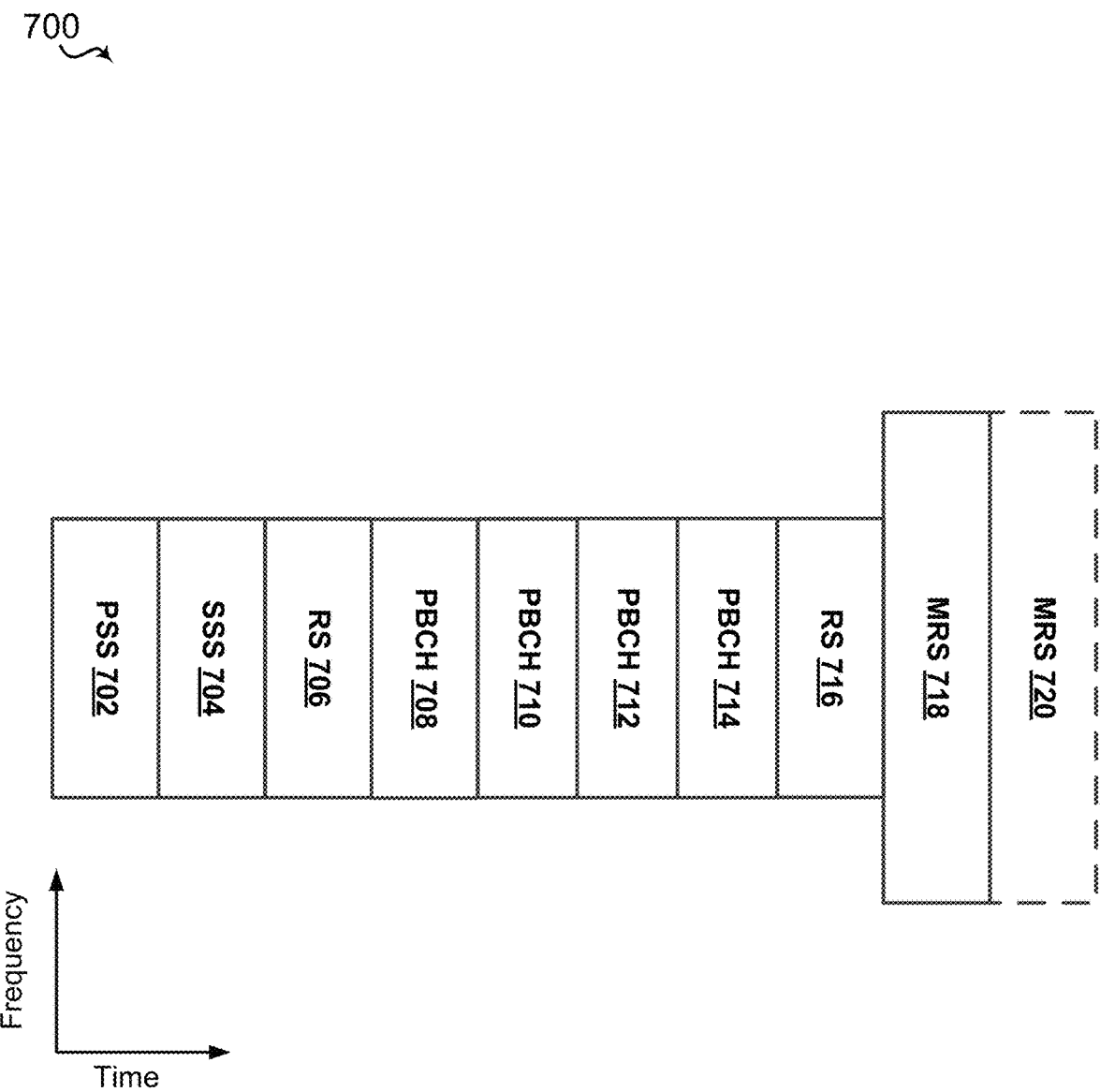
FIGS. 7A and 7B are conceptual diagrams of example configurations of transmitting dedicated reference signal.
Figure 7B:
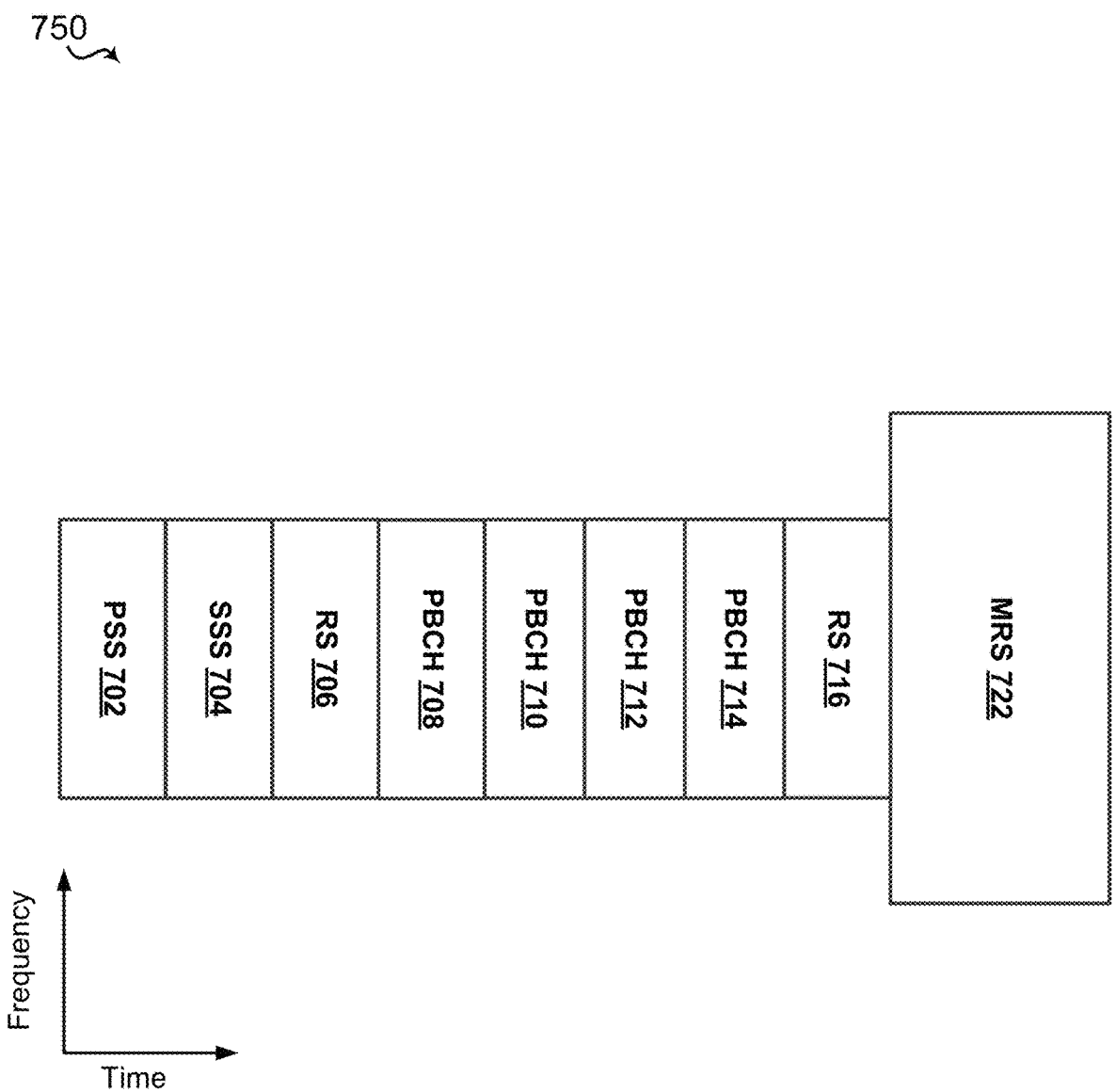

FIGS. 7A and 7B illustrate conceptual diagrams of example dedicated RS configurations 700 and 750, respectively, including example aspects of measurement reference signal (MRS) configurations with a 30 kHz subcarrier spacing (SCS) in FIG. 7A and with a 15 kHz SCS in FIG. 7B, respectively. For example, a UE and a base station, such as, the UE 110 and the base station 105, respectively, may be configured to communicate at least one dedicated RS, such as at least one dedicated DMRS 172 for demodulating the PBCH 174.

In an aspect, the MRS may be anchored in a synchronization slot, and the base station 105 and/or configuration component 170 may reserve two symbols, 718 and 720, of 30 kHZ SCS for the flexible configuration of MRS (e.g., 15 kHz MRS SCS). For example, the number of configured MRS symbols may be configured in system information (e.g., MSIB). Additionally, the MRS may be cell specific MRS (for downlink mobility) or zone-specific MRS for uplink mobility, which may be configured in the system information in symbol 722.

Further, in an example, a single antenna port PBCH transmission configuration may be supported. For all of the dedicated DMRS locations described above, the same reference signal(s) may be transmitted. No combination structure is needed as only a single antenna port may be configured/supported.

Figure 8:
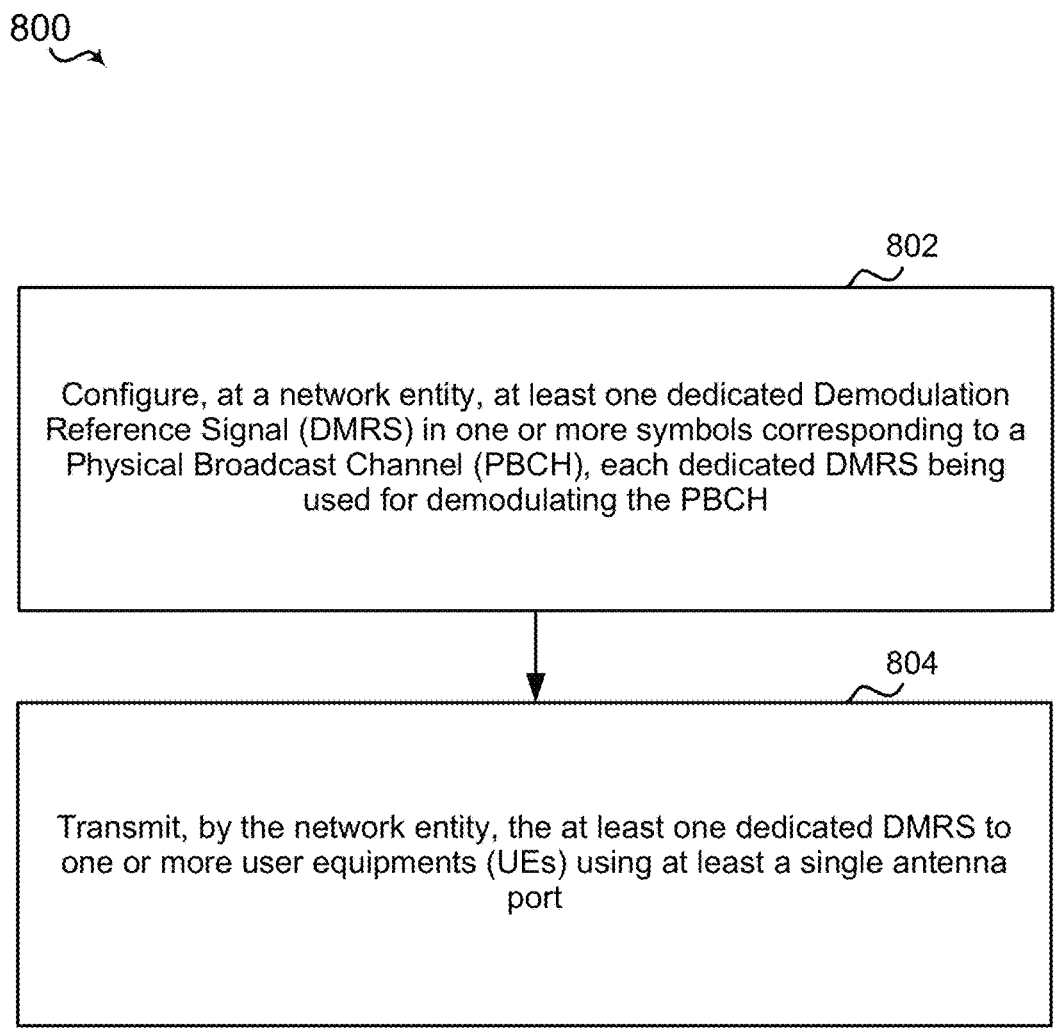
FIG. 8 is a flow diagram of an example of a method for utilizing dedicated reference signals for demodulating a PBCH for wireless communications at a network entity.

Referring to FIG. 8, for example, a method 800 of wireless communication at the base station 105 according to the above-described aspects to utilize a dedicated reference signal, such as DMRS 172 for demodulating a PBCH 174 in a wireless communication system includes one or more of the herein-defined actions.

At block 802, the method 800 may configure, at a network entity, at least one dedicated DMRS in one or more symbols corresponding to a PBCH, each dedicated DMRS being used for demodulating the PBCH. For example, the base station 105 may execute the configuration component 170 to configure at least one dedicated DMRS 172 in one or more symbols corresponding to a PBCH 174, each dedicated DMRS 172 being used for demodulating the PBCH 174.

At block 804, the method 800 may transmit, by the network entity, the at least one dedicated DMRS to one or more UEs using at least a single antenna port. For example, the base station 105 may execute the configuration component 170 to transmit the at least one dedicated DMRS 172 to one or more UEs 110 using at least a single antenna port.

Figure 9:
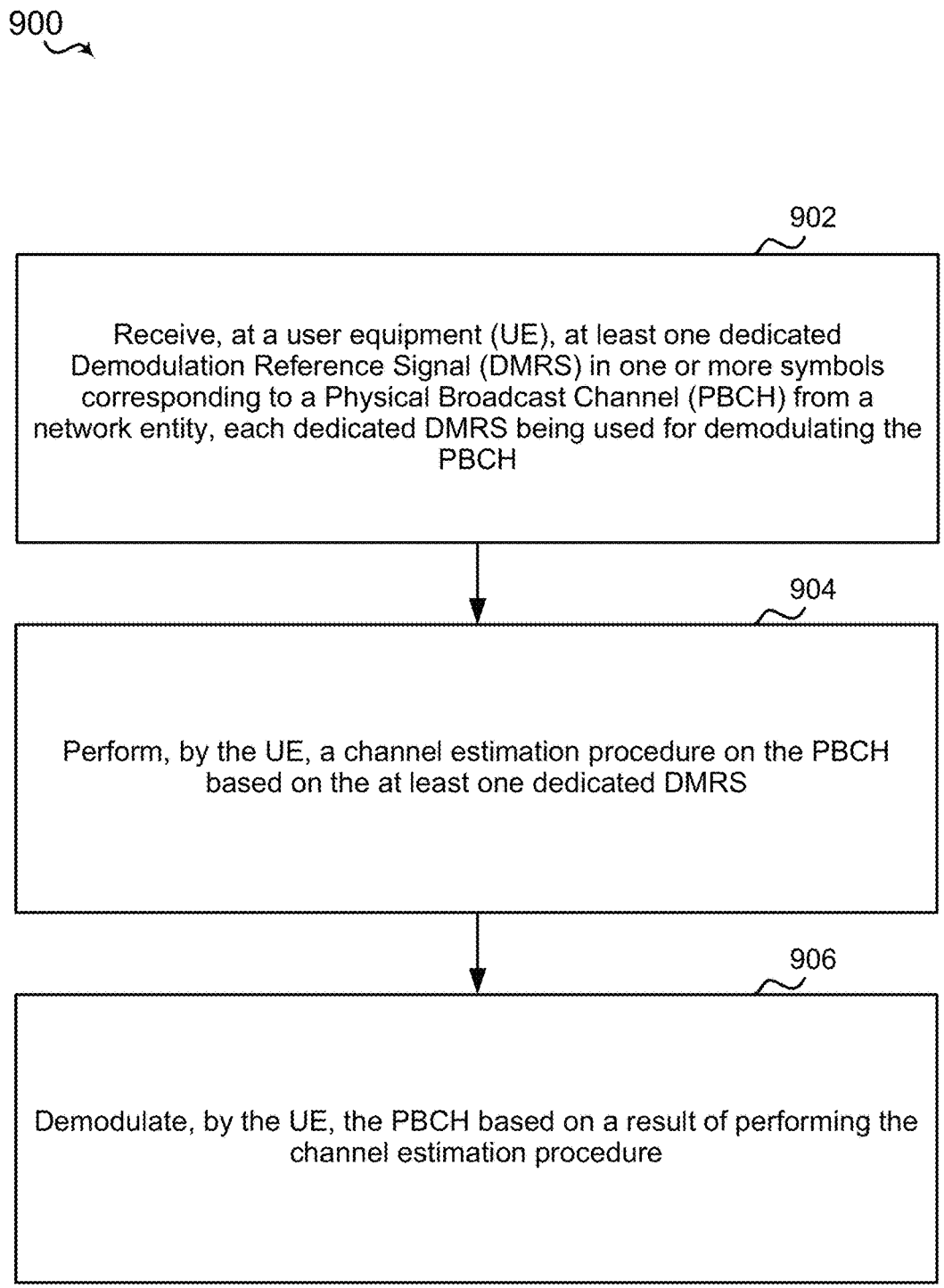
FIG. 9 is a flow diagram of an example of a method for utilizing dedicated reference signals for demodulating a PBCH for wireless communications at a UE.

Referring to FIG. 9, for example, a method 900 of wireless communication at the UE 110 according to the above-described aspects to utilize a dedicated reference signal, such as DMRS 172 for demodulating a PBCH 174 in a wireless communication system includes one or more of the herein-defined actions.

At block 902, the method 900 may receive, at a UE, at least one dedicated DMRS in one or more symbols corresponding to a PBCH from a network entity, each dedicated DMRS being used for demodulating the PBCH. For example, the UE 110 may execute the dedicated RS processing component 150 to receive at least one dedicated DMRS 172 in one or more symbols corresponding to a PBCH 174 from the base station 105, each dedicated DMRS 172 being used for demodulating the PBCH 174.

At block 904, the method 900 may perform, by the UE, a channel estimation procedure on the PBCH based on the at least one dedicated DMRS. For example, the UE 110 and/or the dedicated RS processing component 150 may execute the performing component 152 to perform a channel estimation procedure 154 on the PBCH 174 based on the at least one dedicated DMRS 172.

At block 906, the method 900 may demodulate, by the UE, the PBCH based on a result of performing the channel estimation procedure. For example, the UE 110 and/or the dedicated RS processing component 150 may execute the demodulation component 156 to demodulate the PBCH 174 based on a result of performing the channel estimation procedure 154.

Figure 10:
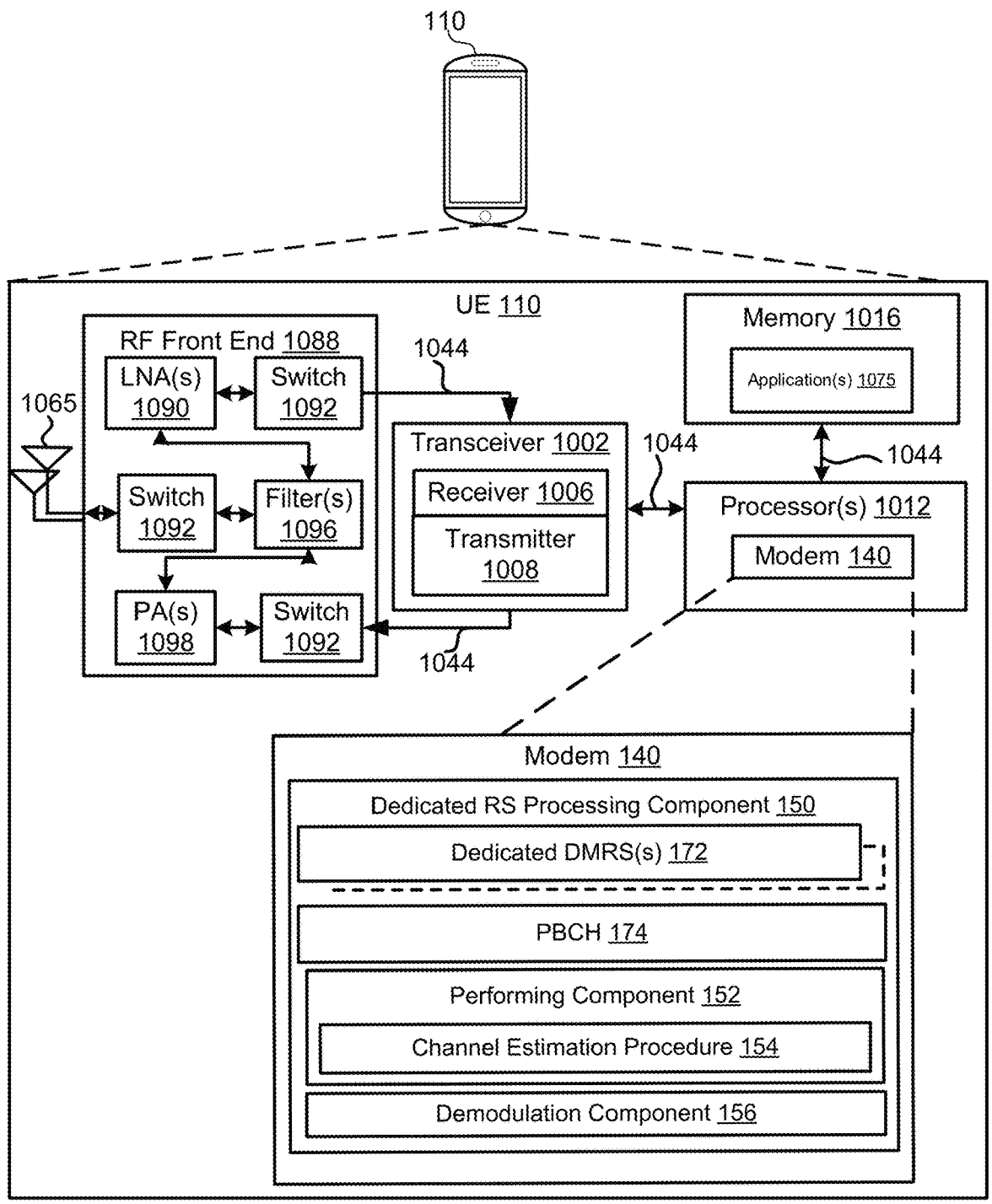
FIG. 10 is a schematic diagram of example components of the UE of FIG. 1.

Referring to FIG. 10, one example of an implementation of an UE 110 may include a variety of components, some of which have already been described above, but including components such as one or more processors 1012 and memory 1016 and transceiver 1002 in communication via one or more buses 1044, which may operate in conjunction with modem 140 and dedicated RS processing component 150. Further, the one or more processors 1012, modem 140, memory 1016, transceiver 1002, radio frequency (RF) front end 1088 and one or more antennas 1065, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 1012 can include a modem 140 that uses one or more modem processors. The various functions related to dedicated RS processing component 150 may be included in modem 140 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 140 associated with dedicated RS processing component 150 may be performed by transceiver 1002.

Also, the memory 1016 may be configured to store data used herein and/or local versions of applications 1075 or dedicated RS processing component 150 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining dedicated RS processing component 150 and/or one or more of its subcomponents, and/or data associated therewith, when UE 110 is operating at least one processor 1012 to execute dedicated RS processing component 150 and/or one or more of its subcomponents.

The transceiver 1002 may include at least one receiver 1006 and at least one transmitter 1008. The receiver 1006 may include hardware, firmware, and/or software code executable by a processor for receiving data, the code comprising instructions and being stored in a memory (e.g., computer-readable medium). The receiver 1006 may be, for example, a RF receiver. In an aspect, the receiver 1006 may receive signals transmitted by at least one base station 105. Additionally, the receiver 1006 may process such received signals, and also may obtain measurements of the signals, such as, but not limited to, Ec/Io, SNR, RSRP, RSSI, etc. The transmitter 1008 may include hardware, firmware, and/or software code executable by a processor for transmitting data, the code comprising instructions and being stored in a memory (e.g., computer-readable medium). A suitable example of the transmitter 1008 may include, but is not limited to, an RF transmitter.

Moreover, in an aspect, the UE 110 may include the RF front end 1088, which may operate in communication with one or more antennas 1065 and transceiver 1002 for receiving and transmitting radio transmissions, for example, wireless communications transmitted by at least one base station 105 or wireless transmissions transmitted by the UE 110. The RF front end 1088 may be coupled with one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, the LNA 1090 can amplify a received signal at a desired output level. In an aspect, each LNA 1090 may have a specified minimum and maximum gain values. In an aspect, the RF front end 1088 may use one or more switches 1092 to select a particular LNA 1090 and a specified gain value based on a desired gain value for a particular application.

Further, for example, the one or more PA(s) 1098 may be used by the RF front end 1088 to amplify a signal for an RF output at a desired output power level. In an aspect, each PA 1098 may have specified minimum and maximum gain values. In an aspect, the RF front end 1088 may use one or more switches 1092 to select a particular PA 1098 and a corresponding specified gain value based on a desired gain value for a particular application.

Also, for example, the one or more filters 1096 can be used by the RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be coupled with a specific LNA 1090 and/or PA 1098. In an aspect, the RF front end 1088 can use one or more switches 1092 to select a transmit or receive path using a specified filter 1096, LNA 1090, and/or PA 1098, based on a configuration as specified by transceiver 1002 and/or processor 1012.

As such, the transceiver 1002 may be configured to transmit and receive wireless signals through one or more antennas 1065 via the RF front end 1088. In an aspect, transceiver 1002 may be tuned to operate at specified frequencies such that the UE 110 can communicate with, for example, the one or more base stations 105 or one or more cells associated with one or more base stations 105. In an aspect, for example, the modem 140 can configure the transceiver 1002 to operate at a specified frequency and power level based on the UE configuration of the UE 110 and the communication protocol used by the modem 140.

In an aspect, the modem 140 can be a multiband-multimode modem, which can process digital data and communicate with the transceiver 1002 such that the digital data is sent and received using the transceiver 1002. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 11:
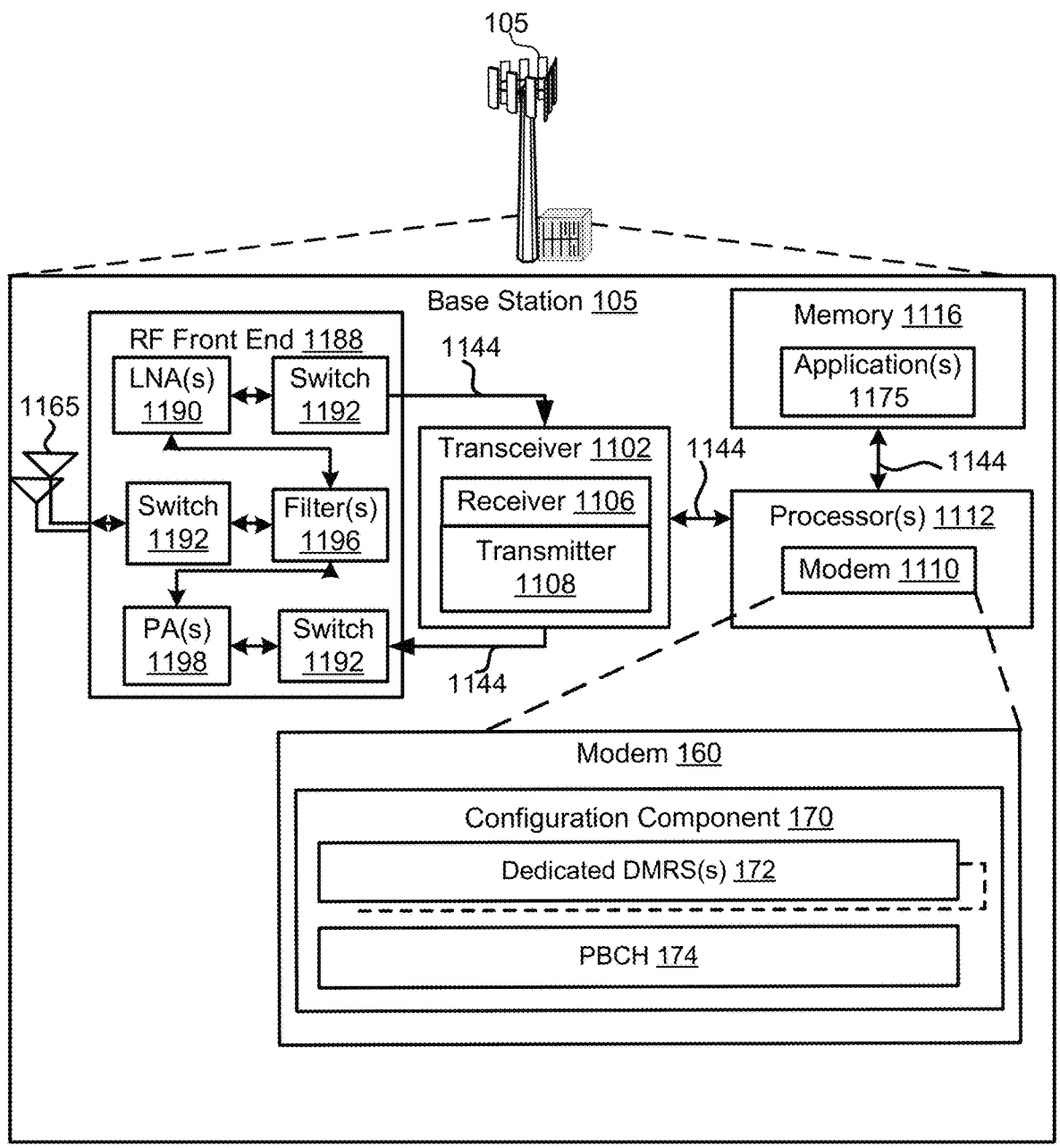
FIG. 11 is a schematic diagram of example components of the base station of FIG. 1.

Referring to FIG. 11, one example of an implementation of base station 105 may include a variety of components, some of which have already been described above, but including components such as one or more processors 1112, a memory 1116, and a transceiver 1102 in communication via one or more buses 1144, which may operate in conjunction with the modem 160 and configuration component 170 to enable one or more of the functions described herein.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
 configuring, at a network entity, at least one dedicated Demodulation Reference Signal (DMRS) in one or more symbols corresponding to a Physical Broadcast Channel (PBCH), each dedicated DMRS being used for demodulating the PBCH, wherein configuring the at least one dedicated DMRS in the one or more symbols corresponding to the PBCH further comprises assigning the at least one dedicated DMRS to one or more symbols having a same numerology as the one or more symbols corresponding to the PBCH; and
 transmitting, by the network entity, the at least one dedicated DMRS to one or more user equipments (UEs) using at least a single antenna port.

2. The method of claim 1, wherein configuring the at least one dedicated DMRS in the one or more symbols corresponding to the PBCH further comprises interleaving the at least one dedicated DMRS in each of the one or more symbols corresponding to the PBCH based on frequency division multiplexing (FDM).

3. The method of claim 2, wherein interleaving the at least one dedicated DMRS in each of the one or more symbols corresponding to the PBCH based on FDM further comprises assigning a resource element (RE) to each dedicated DMRS symbol of each of the at least one dedicated DMRS.

4. The method of claim 3, wherein a remaining plurality of REs of each of the one or more symbols carry the PBCH, each of the remaining plurality of REs correspond to REs not assigned for each dedicated DMRS.

5. The method of claim 2, wherein transmitting the at least one dedicated DMRS to the one or more UEs using at least the single antenna port configuration further comprises transmitting each of the one or more symbols corresponding to the PBCH with the interleaved at least one dedicated DMRS using the single antenna port.

6. The method of claim 1, wherein having the same numerology corresponds to each of the one or more symbols assigned with the at least one dedicated DMRS and each of the one or more symbols corresponding to the PBCH being configured with an identical sub-carrier spacing and cyclic prefix.

7. The method of claim 1, wherein assigning the at least one dedicated DMRS to the one or more symbols having the same numerology as the one or more symbols corresponding to the PBCH further comprises assigning a first dedicated DMRS to a first symbol and a second dedicated DMRS to a second symbol, the first dedicated DMRS being configured for a first antenna port and the second dedicated DMRS being configured for a second antenna port.

8. The method of claim 7, wherein transmitting the at least one dedicated DMRS to the one or more UEs using at least the single antenna port configuration further comprises:
 transmitting the first dedicated DMRS to the one or more UEs using the first antenna port; and
 transmitting the second dedicated DMRS to the one or more UEs using the second antenna port.

9. The method of claim 1, wherein assigning the at least one dedicated DMRS to the one or more symbols having the same numerology as the one or more symbols corresponding to the PBCH further comprises assigning a first dedicated DMRS to a first symbol and a second dedicated DMRS to a second symbol, each of the first dedicated DMRS and the second dedicated DMRS includes a first transmission combination and a second transmission combination; and wherein transmitting the at least one dedicated DMRS to the one or more UEs using at least the single antenna port configuration further comprises:

transmitting, for each of the first dedicated DMRS and the second dedicated DMRS, a first subset of tones to the one or more UEs using a first antenna port; and transmitting, for each of the first dedicated DMRS and the second dedicated DMRS, a second subset of tones to the one or more UEs using a second antenna port, the second subset of tones differing from the first subset of tones.

10. The method of claim 1, wherein configuring the at least one dedicated DMRS in the one or more symbols corresponding to the PBCH further comprises configuring the at least one dedicated DMRS in each of the one or more symbols corresponding to the PBCH.

11. A method of wireless communication, comprising:
receiving, at a user equipment (UE), at least one dedicated Demodulation Reference Signal (DMRS) in one or more symbols corresponding to a Physical Broadcast Channel (PBCH) from a network entity, each dedicated DMRS being used for demodulating the PBCH, wherein receiving the at least one dedicated DMRS in the one or more symbols corresponding to the PBCH from the network entity further comprises receiving a first dedicated DMRS to a first symbol and a second dedicated DMRS to a second symbol, and wherein the first dedicated DMRS in the first symbol and the second dedicated DMRS in the second symbol have a same numerology as the one or more symbols corresponding to the PBCH;

performing, by the UE, a channel estimation procedure on the PBCH based on the at least one dedicated DMRS; and demodulating, by the UE, the PBCH based on a result of performing the channel estimation procedure.

12. The method of claim 11, wherein the at least one dedicated DMRS is interleaved in each of the one or more symbols corresponding to the PBCH based on frequency division multiplexing (FDM).

13. The method of claim 12, wherein each of the one or more symbols corresponding to the PBCH includes a resource element (RE) assigned to each dedicated DMRS symbol of each of the at least one dedicated DMRS.

14. The method of claim 13, wherein each of the one or more symbols corresponding to the PBCH includes a remaining plurality of REs carrying the PBCH, each of the remaining plurality of REs correspond to REs not assigned for each dedicated DMRS.

15. The method of claim 11, wherein receiving the at least one dedicated DMRS in the one or more symbols corresponding to the PBCH from the network entity further comprises receiving the at least one dedicated DMRS in the one or more symbols corresponding to the PBCH from the network entity based on a single antenna port of the network entity.

16. The method of claim 11, wherein having the same numerology corresponds to each of the first symbol and second symbol and each of the one or more symbols corresponding to the PBCH being configured with an identical sub-carrier spacing and cyclic prefix.

17. The method of claim 11, wherein receiving the first dedicated DMRS and the second dedicated DMRS further comprises receiving the first dedicated DMRS and the second dedicated DMRS based on a first antenna port and a second antenna port of the network entity.

18. An apparatus for wireless communication, comprising:
a memory; and
a processor in communication with the memory, wherein the processor is configured to:
configure at least one dedicated Demodulation Reference Signal (DMRS) in one or more symbols corresponding to a Physical Broadcast Channel (PBCH), each dedicated DMRS being used for demodulating the PBCH, wherein the processor configured to configure the at least one dedicated DMRS in the one or more symbols corresponding to the PBCH is further configured to assign the at least one dedicated DMRS to one or more symbols having a same numerology as the one or more symbols corresponding to the PBCH; and
transmit the at least one dedicated DMRS to one or more user equipments (UEs) using at least a single antenna port.

19. The apparatus of claim 18, wherein the processor configured to configure the at least one dedicated DMRS in the one or more symbols corresponding to the PBCH further is further configured to interleave the at least one dedicated DMRS in each of the one or more symbols corresponding to the PBCH based on frequency division multiplexing (FDM).

20. The apparatus of claim 19, wherein the processor configured to interleave the at least one dedicated DMRS in each of the one or more symbols corresponding to the PBCH based on FDM is further configured to assign a resource element (RE) to each dedicated DMRS symbol of each of the at least one dedicated DMRS.

21. The apparatus of claim 20, wherein a remaining plurality of REs of each of the one or more symbols carry the PBCH, each of the remaining plurality of REs correspond to REs not assigned for each dedicated DMRS.

22. The apparatus of claim 19, wherein the processor configured to transmit the at least one dedicated DMRS to the one or more UEs using at least the single antenna port configuration is further configured to transmit each of the one or more symbols corresponding to the PBCH with the interleaved at least one dedicated DMRS using the single antenna port.

23. The apparatus of claim 18, wherein having the same numerology corresponds to each of the one or more symbols assigned with the at least one dedicated DMRS and each of the one or more symbols corresponding to the PBCH being configured with an identical sub-carrier spacing and cyclic prefix.

24. The apparatus of claim 18, wherein the processor configured to assign the at least one dedicated DMRS to the one or more symbols having the same numerology as the one or more symbols corresponding to the PBCH is further configured to assign a first dedicated DMRS to a first symbol and a second dedicated DMRS to a second symbol, the first dedicated DMRS being configured for a first antenna port and the second dedicated DMRS being configured for a second antenna port.

25. The apparatus of claim 24, wherein the processor configured to transmit the at least one dedicated DMRS to the one or more UEs using at least the single antenna port configuration is further configured to:

transmit the first dedicated DMRS to the one or more UEs using the first antenna port; and
transmit the second dedicated DMRS to the one or more UEs using the second antenna port.

26. The apparatus of claim 18, wherein the processor configured to assign the at least one dedicated DMRS to the one or more symbols having the same numerology as the one or more symbols corresponding to the PBCH is further configured to assign a first dedicated DMRS to a first symbol and a second dedicated DMRS to a second symbol, each of the first dedicated DMRS and the second dedicated DMRS includes a first transmission combination and a second transmission combination; and
wherein the processor configured to transmit the at least one dedicated DMRS to the one or more UEs using at least the single antenna port configuration is further configured to:
transmit, for each of the first dedicated DMRS and the second dedicated DMRS, a first subset of tones to the one or more UEs using a first antenna port; and
transmit, for each of the first dedicated DMRS and the second dedicated DMRS, a second subset of tones to the one or more UEs using a second antenna port, the second subset of tones differing from the first subset of tones.

27. The apparatus of claim 18, wherein the processor configured to configure the at least one dedicated DMRS in the one or more symbols corresponding to the PBCH is further configured to configure the at least one dedicated DMRS in each of the one or more symbols corresponding to the PBCH.

28. An apparatus for wireless communication, comprising:
a memory; and
a processor in communication with the memory, wherein the processor is configured to:
receive, at a user equipment (UE), at least one dedicated Demodulation Reference Signal (DMRS) in one or more symbols corresponding to a Physical Broadcast Channel (PBCH) from a network entity, each dedicated DMRS being used for demodulating the PBCH, wherein the processor configured to receive the at least one dedicated DMRS in the one or more symbols corresponding to the PBCH from the network entity is further configured to receive a first dedicated DMRS to a first symbol and a second dedicated DMRS to a second symbol, wherein the first dedicated DMRS in the first symbol and the second dedicated DMRS in the second symbol have a same numerology as the one or more symbols corresponding to the PBCH;
perform, by the UE, a channel estimation procedure on the PBCH based on the at least one dedicated DMRS; and
demodulate, by the UE, the PBCH based on a result of performing the channel estimation procedure.

29. The apparatus of claim 28, wherein the at least one dedicated DMRS is interleaved in each of the one or more symbols corresponding to the PBCH based on frequency division multiplexing (FDM).

30. The apparatus of claim 29, wherein each of the one or more symbols corresponding to the PBCH includes a resource element (RE) assigned to each dedicated DMRS symbol of each of the at least one dedicated DMRS.

31. The apparatus of claim 30, wherein each of the one or more symbols corresponding to the PBCH includes a remaining plurality of REs carrying the PBCH, each of the remaining plurality of REs correspond to REs not assigned for each dedicated DMRS.

32. The apparatus of claim 28, wherein the processor configured to receive the at least one dedicated DMRS in the one or more symbols corresponding to the PBCH from the network entity is further configured to receive the at least one dedicated DMRS in the one or more symbols corresponding to the PBCH from the network entity based on a single antenna port of the network entity.

33. The apparatus of claim 28, wherein having the same numerology corresponds to each of the first symbol and second symbol and each of the one or more symbols corresponding to the PBCH being configured with an identical sub-carrier spacing and cyclic prefix.

34. The apparatus of claim 28, wherein the processor configured to receive the first dedicated DMRS and the second dedicated DMRS is further configured to receive the first dedicated DMRS and the second dedicated DMRS based on a first antenna port and a second antenna port of the network entity.

35. A non-transitory computer-readable medium storing computer code executable for wireless communications, comprising:
code for configuring, at a network entity, at least one dedicated Demodulation Reference Signal (DMRS) in one or more symbols corresponding to a Physical Broadcast Channel (PBCH), each dedicated DMRS being used for demodulating the PBCH, wherein code for configuring the at least one dedicated DMRS in the one or more symbols corresponding to the PBCH further comprises code for assigning the at least one dedicated DMRS to one or more symbols having a same numerology as the one or more symbols corresponding to the PBCH; and
code for transmitting, by the network entity, the at least one dedicated DMRS to one or more user equipments (UEs) using at least a single antenna port.

36. A non-transitory computer-readable medium storing computer code executable for wireless communications, comprising:
code for receiving, at a user equipment (UE), at least one dedicated Demodulation Reference Signal (DMRS) in one or more symbols corresponding to a Physical Broadcast Channel (PBCH) from a network entity, each dedicated DMRS being used for demodulating the PBCH, wherein code for receiving the at least one dedicated DMRS in the one or more symbols corresponding to the PBCH from the network entity further comprises code for receiving a first dedicated DMRS to a first symbol and a second dedicated DMRS to a second symbol, and wherein the first dedicated DMRS in the first symbol and the second dedicated DMRS in the second symbol have a same numerology as the one or more symbols corresponding to the PBCH;
code for performing, by the UE, a channel estimation procedure on the PBCH based on the at least one dedicated DMRS; and
code for demodulating, by the UE, the PBCH based on a result of performing the channel estimation procedure.

37. An apparatus for wireless communication, comprising:
means for configuring, at a network entity, at least one dedicated Demodulation Reference Signal (DMRS) in one or more symbols corresponding to a Physical Broadcast Channel (PBCH), each dedicated DMRS being used for demodulating the PBCH, wherein means for configuring the at least one dedicated DMRS in the one or more symbols corresponding to the PBCH further comprises means for assigning the at least one dedicated DMRS to one or more symbols having a same numerology as the one or more symbols corresponding to the PBCH; and means for transmitting, by the network entity, the at least one dedicated DMRS to one or more user equipments (UEs) using at least a single antenna port.

38. An apparatus for wireless communications, comprising:

means for receiving, at a user equipment (UE), at least one dedicated Demodulation Reference Signal (DMRS) in one or more symbols corresponding to a Physical Broadcast Channel (PBCH) from a network entity, each dedicated DMRS being used for demodulating the PBCH, wherein means for receiving the at least one dedicated DMRS in the one or more symbols corresponding to the PBCH from the network entity further comprises means for receiving a first dedicated DMRS to a first symbol and a second dedicated DMRS to a second symbol, and wherein the first dedicated DMRS in the first symbol and the second dedicated DMRS in the second symbol have a same numerology as the one or more symbols corresponding to the PBCH;

means for performing, by the UE, a channel estimation procedure on the PBCH based on the at least one dedicated DMRS; and means for demodulating, by the UE, the PBCH based on a result of performing the channel estimation procedure.

* * * * *